(12) United States Patent
Han

(10) Patent No.: US 12,541,421 B2
(45) Date of Patent: Feb. 3, 2026

(54) SERVER BOARD CARD APPARATUS, DETECTION METHOD THEREFOR, AND DETECTION DEVICE THEREOF, AND STORAGE MEDIUM

(71) Applicant: SHANDONG YINGXIN COMPUTER TECHNOLOGIES CO., LTD., Shandong (CN)

(72) Inventor: Hongrui Han, Shandong (CN)

(73) Assignee: SHANDONG YINGXIN COMPUTER TECHNOLOGIES CO., LTD., Shandong (CN)

( * ) Notice: Subject to any disclaimer, the term of this patent is extended or adjusted under 35 U.S.C. 154(b) by 315 days.

(21) Appl. No.: 18/276,640

(22) PCT Filed: Apr. 28, 2022

(86) PCT No.: PCT/CN2022/089769
§ 371 (c)(1),
(2) Date: Aug. 9, 2023

(87) PCT Pub. No.: WO2022/237549
PCT Pub. Date: Nov. 17, 2022

(65) Prior Publication Data
US 2024/0126639 A1      Apr. 18, 2024

(30) Foreign Application Priority Data
May 14, 2021  (CN) .......................... 202110527720.3

(51) Int. Cl.
*G06F 11/07*      (2006.01)
*H05K 7/14*       (2006.01)

(52) U.S. Cl.
CPC ...... *G06F 11/0793* (2013.01); *G06F 11/0709* (2013.01); *H05K 7/1487* (2013.01)

(58) Field of Classification Search
CPC ............. G06F 11/0793; G06F 11/0709; H05K 7/1487; G05B 2219/21087; G05D 23/24;
(Continued)

(56) References Cited

U.S. PATENT DOCUMENTS 10,164,449 B2 *  12/2018  Liang ................... H02J 7/00308
10,574,004 B2 *   2/2020  Akita .................. H01R 13/7137
CN  204U54406     2/2015
CN  106598807     4/2017
CN  107A66067     8/2017
(Continued)

FOREIGN PATENT DOCUMENTS

CN       103712709 A     4/2014
CN       103995766 A     8/2014
(Continued)

*Primary Examiner* — Brian T Misiura
(74) *Attorney, Agent, or Firm* — IPro, PLLC

(57) ABSTRACT

The present application discloses a server card apparatus, a detection method therefor, and a detection device thereof, and a storage medium. The server card apparatus comprises: a mainboard, a card comprising a voltage dividing resistor, and a cable connected to the mainboard by means of a first plug connector and connected to the card by means of a second plug connector. The cable comprises a power line, a grounding line, a detection line, and a plurality of thermistors; and a BMC in the mainboard obtains electrical parameters of the plurality of thermistors by means of the detection line, and determines, according to the electrical parameters, whether the first plug connector and the second plug connector are abnormal or not.

20 Claims, 3 Drawing Sheets

(58) Field of Classification Search
CPC ........ G05D 23/303; G01K 7/22; H03H 7/251; H01H 2085/0483; H02H 3/085
See application file for complete search history.

(56) References Cited

U.S. PATENT DOCUMENTS

| | | | |
|---|---|---|---|
| 10,788,775 B2* | 9/2020 | Okamoto | G03G 21/1685 |
| 10,978,893 B2* | 4/2021 | Pk | G01K 13/00 |
| 11,329,477 B2* | 5/2022 | Yamane | H02J 7/00 |
| 2010/0256866 A1 | 10/2010 | Toda et al. | |
| 2010/0315752 A1 | 12/2010 | Rabu et al. | |
| 2016/0006190 A1* | 1/2016 | Katsuura | H02H 5/04 |
| | | | 439/502 |
| 2017/0108910 A1* | 4/2017 | Goh | G06F 1/305 |
| 2019/0013663 A1* | 1/2019 | Odaohhara | H02H 5/041 |

FOREIGN PATENT DOCUMENTS

| | | |
|---|---|---|
| CN | 206892852 U | 1/2018 |
| CN | 108054795 A | 5/2018 |
| CN | 108429092 A | 8/2018 |
| CN | 207780767 U | 8/2018 |
| CN | 109408317 A | 3/2019 |
| CN | 208607653 U | 3/2019 |
| CN | 209264857 U | 8/2019 |
| CN | 111509504 A | 8/2020 |
| CN | 112131060 A | 12/2020 |
| CN | 112306796 A | 2/2021 |
| CN | 112433766 A | 3/2021 |
| CN | 112486743 A | 3/2021 |
| CN | 113204470 A | 8/2021 |
| JP | 2001246747 A | 9/2001 |
| JP | 2004272829 A | 9/2004 |

* cited by examiner

SERVER BOARD CARD APPARATUS, DETECTION METHOD THEREFOR, AND DETECTION DEVICE THEREOF, AND STORAGE MEDIUM

The present disclosure claims the priority of the Chinese patent application filed on May 14, 2021 before the CNIPA, China National Intellectual Property Administration with the application number of 202110527720.3 and the title of "SERVER CARD APPARATUS, DETECTION METHOD THEREFOR, AND DETECTION DEVICE THEREOF, AND STORAGE MEDIUM", which is incorporated herein in its entirety by reference.

FIELD

The present application relates to the field of server hardware, in particular to a server card apparatus, a detection method therefor, and detection device thereof and a storage medium.

BACKGROUND

At present, with the development of large data services, the power consumption of Graphics Processing Unit (GPU), network cards, fans and other components is increasing, the overall power consumption of the server is increasing, and under the condition of constant server voltage, the current among the cards carrying these components is also increasing. Cable connection is used among different cards; however, there are circumstances such as plug and pull wear, plug and pull not in place, foreign matter, plug deformation and aging, etc. between the plug and connector of cable; there are potential dangers such as poor contact, excessive contact resistance and even short circuit and open circuit; there may also be problems such as ablation, thermal deformation and even melting and burning due to abnormal increase in temperature of connector or cable.

In order to solve the above problems, some staffs use a temperature sensor near the card socket to detect the temperature of the connector, and use a card chip to monitor the temperature; however, due to the distance and space, the sensor cannot accurately and timely sense the state change of the connector, and the card chip cannot timely handle abnormal conditions.

Therefore, how to provide a solution for solving the above-mentioned technical problem is a problem to be solved by a person skilled in the art at present.

SUMMARY

In view of this, an object of the present application is to provide a server card apparatus for quickly processing a plug-in abnormal situation and a detection method therefor, and a detection device thereof, and a storage medium. The specific technical solution thereof is as follows:

a server card apparatus including: a main board, a card including a voltage dividing resistor, and a cable connected to the main board by means of a first plug connector and connected to the card by means of a second plug connector; wherein the cable includes a power line, a grounding line, a detection line, and a plurality of thermistors;

wherein two ends of the power line, two ends of the grounding line and two ends of the detection line are respectively connected into the first plug connector and the second plug connector;

the plurality of the thermistors are respectively arranged in the first plug connector and the second plug connector, a first end of the voltage dividing resistor and the plurality of the thermistors are both connected to the detection line, a second end of the voltage dividing resistor is connected to the power line or the grounding line, and a second end of each of the thermistors is connected to the grounding line or to the power line; and a BMC in the main board acquires electrical parameters of the plurality of thermistors by means of the detection line, and determines, according to the electrical parameters, whether the first plug connector and the second plug connector are abnormal or not.

Alternatively, the card includes two of the voltage dividing resistors, the cable includes two of the thermistors and two of the detection lines, wherein:

each of the detection lines is connected to one of the voltage dividing resistors and one of the thermistors; and two thermistors are respectively provided in the first plug connector and the second plug connector.

Alternatively, a plurality of the thermistors is divided into two groups, respectively dispersed in the first plug connector and the second plug connector.

Alternatively, the BMC is used for:

determining the temperature of the plug connector according to the electrical parameter, and determining whether the temperature of the first plug connector and the second plug connector is abnormal, and if yes, executing a temperature abnormality regulation strategy on the card;

the temperature abnormality regulation strategy includes limiting power consumption, and/or reducing frequency, and/or partially powering down, and/or powering down the card.

Alternatively, the BMC is further used for:

acquiring a card temperature of the card, comparing the plug connector temperature with the card temperature, and when a difference value between the plug connector temperature and the card temperature exceeds a preset range, determining that the temperature of the first plug connector or the second plug connector is abnormal.

Alternatively, the BMC is further used for:

determining whether the connection state of the first plug connector and the second plug connector is abnormal according to the electrical parameter, and if yes, sending out alarm information.

Alternatively, the BMC is further used for:

acquiring configuration information about the card to determine a temperature abnormality regulation strategy corresponding to the card.

Accordingly, the present application further discloses a method for detecting a server card apparatus, applied to the above-mentioned server card apparatus, the method including:

acquiring, by a BMC in the main board, electrical parameters of the plurality of thermistors by means of the detection line, and determining, according to the electrical parameters, whether the first plug connector and the second plug connector are abnormal or not.

Accordingly, the present application further discloses a method for detecting a server card apparatus, including:
- a memory for storing a computer program;
- a processor for implementing the steps of the method for detecting the server card apparatus as described above when executing the computer program.

Accordingly, the present application further discloses a readable storage medium having stored thereon a computer program which when executed by a processor implements the steps of the method for detecting the server card apparatus as described above.

The present application discloses a server card apparatus including: a main board, a card including a voltage dividing resistor, and a cable connected to the main board by means of a first plug connector and connected to the card by means of a second plug connector; wherein the cable includes a power line, a grounding line, a detection line, and a plurality of thermistors; wherein two ends of the power line, two ends of the grounding line and two ends of the detection line are respectively connected into the first plug connector and the second plug connector;

the plurality of the thermistors are respectively arranged in the first plug connector and the second plug connector, a first end of the voltage dividing resistor and the plurality of the thermistors are both connected to the detection line, a second end of the voltage dividing resistor is connected to the power line or the grounding line, and a second end of each of the thermistors is connected to the grounding line or to the power line; and a BMC in the main board acquires electrical parameters of the plurality of thermistors by means of the detection line, and determines, according to the electrical parameters, whether the first plug connector and the second plug connector are abnormal or not. According to the present application, the detection line for state detection and the thermistors are provided in the cable, the voltage dividing resistor is provided in the card, the BMC of the main board can rapidly know the state of the first plug connector and the state of the second plug connector by means of the thermistors, the efficiency and the accuracy of the thermistors are far higher than those of the prior art, and the electrical parameters of the thermistors have higher reference value.

BRIEF DESCRIPTION OF THE DRAWINGS

In order to explain the embodiments of the present application or the technical solutions in the prior art more clearly, the following will briefly introduce the drawings which need to be used in the embodiments or the description of the prior art; obviously, the drawings in the following description are merely embodiments of the present application, and it would have been obvious for a person skilled in the art in the art to obtain other drawings according to the provided drawings without involving any inventive effort.

DETAILED DESCRIPTION

Figure 1:
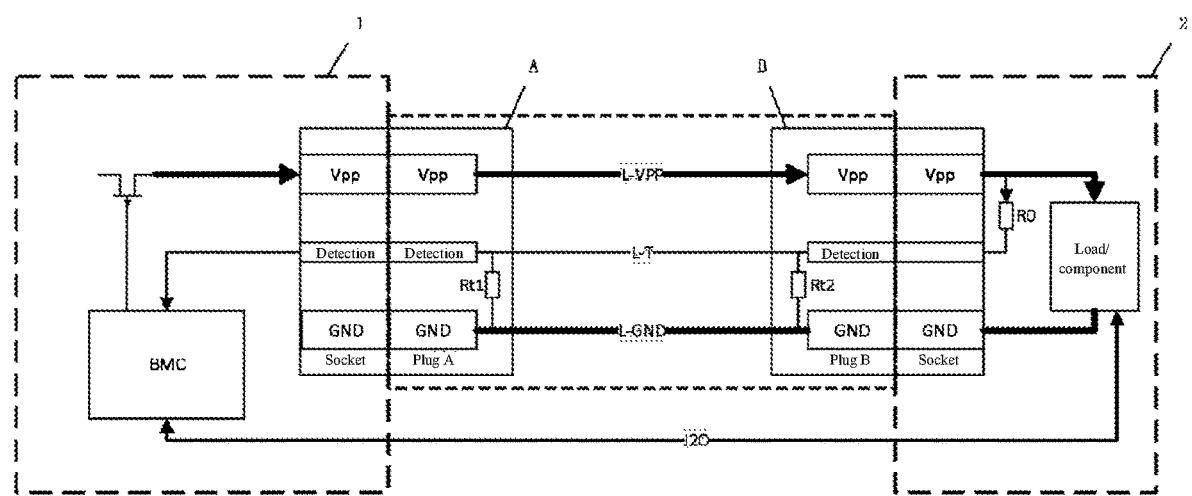
FIG. 1 is a structural distribution diagram showing a server card apparatus according to an embodiment of the present application.

The embodiments of the present application will now be described more fully hereinafter with reference to the accompanying drawings, in which some, but not all embodiments of the present application are shown. Based on the embodiments in the present application, all the other embodiments obtained by a person skilled in the art in the art without involving any inventive effort fall within the scope of protection of the present application.

Some staffs uses a temperature sensor near the card socket to detect the temperature of the connector, and use a card chip to monitor the temperature; however, due to the distance and space, the sensor cannot accurately and timely sense the state change of the connector, and the card chip cannot timely handle abnormal conditions. In the present application, a detection line, a voltage dividing resistor and a thermistor for detecting a state are provided inside a cable, and a main board Baseboard Management Controller (BMC) can quickly learn the state of a first plug connector and a second plug connector via the thermistor, and the efficiency and accuracy thereof are much higher than those in the prior art, and the electrical parameters thereof have a higher reference value.

An embodiment of the present application discloses a server card 2 apparatus including: a main board 1, a card 2 including a voltage dividing resistor R, and a cable connected to the main board 1 via a first plug connector A and connected to the card 2 via a second plug connector B, wherein the cable includes a power line L-VPP, a grounding line L-GND, a detection line L-T and a plurality of thermistors Rt;

either end of the power line L-VPP, the grounding line L-GND and the detection line L-T are respectively connected to the first plug connector A and the second plug connector B;

a plurality of thermistors Rt are respectively arranged in the first plug connector A and the second plug connector B, a first end of the voltage dividing resistor R and the plurality of thermistors Rt are both connected to the detection line L-T, a second end of the voltage dividing resistor R is connected to the power line L-VPP or the grounding line L-GND, and a second end of each thermistor Rt is connected to the grounding line L-GND or is connected to the power line L-VPP;

acquiring, by a BMC in the main board 1, electrical parameters of the plurality of thermistors Rt by means of the detection line L-T, and determining, according to the electrical parameters, whether the first plug connector A and the second plug connector B are abnormal or not.

It can be understood that the thermistors Rt are provided in both the first plug connector A and the second plug connector B, so that the specific temperature of the first plug connector A and that of the second plug connector B are reflected on the electrical parameter of the thermistor Rt, and if the resistance of any thermistor Rt exceeds the resistance range corresponding to the normal temperature, it is considered to be abnormal. The voltage dividing resistor R is also connected to the detection line L-T together with the thermistor Rt; in fact, the voltage dividing resistor R and the thermistor Rt are connected in series between the power supply line L-VPP and the connection line L-GND; a voltage signal is transmitted to the BMC via the detection line L-T; the BMC acquires a corresponding electrical signal by ADC sampling; and according to the electrical signal, whether the connection of the plug connector is normal or not and whether the temperature is normal or not can be analyzed. According to some embodiments, the connection of the thermistor Rt, the voltage dividing resistor R and the detection line L-T is different according to the number and position of the voltage dividing resistor R, and the number and position of the thermistor Rt are different, in particular, the resistance of the thermistor Rt reflects the specific temperature at the position thereof; therefore, the selection of the number and position of the thermistor Rt is determined according to the size and shape of the server card apparatus in actual operation, and there are various solutions in implementation.

For example, four schemes are shown in FIGS. 1-4, wherein:

in the connection way of FIG. 1, there is only one voltage dividing resistor R0 and one detection line L-T, and two thermistors Rt1 and Rt2, wherein Rt1 is located in the first plug connector A, and Rt2 is located in the second plug connector B; in this case, the two thermistors are actually connected in parallel, and no matter which thermistors detect a temperature abnormality, they are reflected on the electrical parameter of the detection line L-T, and BMC can confirm that there is at least one temperature abnormality in the first plug connector A or the second plug connector B.

Figure 2:
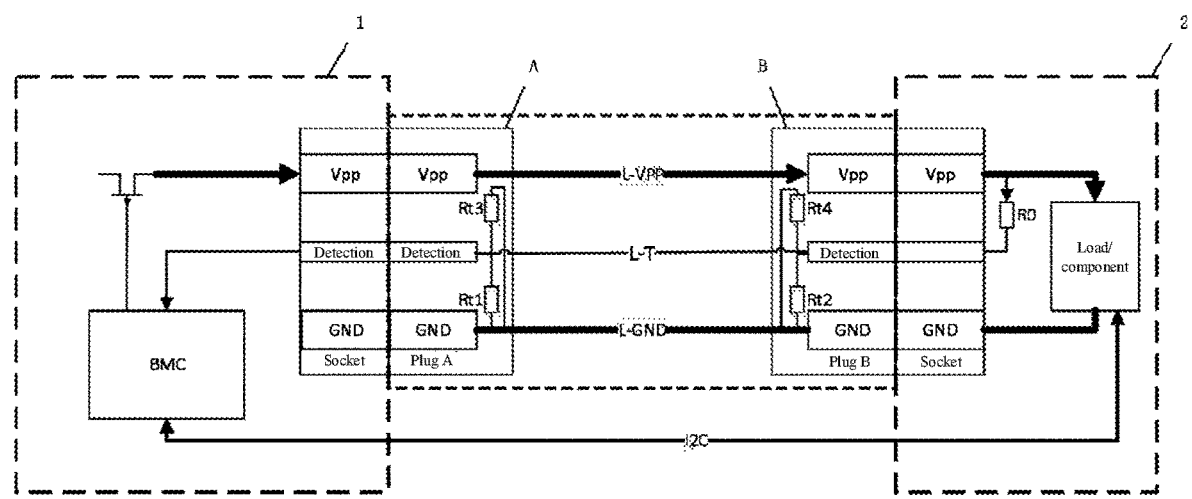
FIG. 2 is a structural distribution diagram showing a second server card apparatus according to an embodiment of the present application.

In the connection scheme of FIG. 2, considering the physical size of connectors, one thermistor Rt cannot fully detect the temperature distribution of one connector, so a plurality of thermistors Rt can be provided on one connector for monitoring, namely: the plurality of thermistors Rt are divided into two groups, respectively dispersed in the first plug connector A and the second plug connector B; as shown in FIG. 2, thermistors Rt1 and Rt3 are dispersed in the first plug connector A, and thermistors Rt2 and Rt4 are dispersed in the second plug connector B. The more thermistors Rt are dispersedly provided, the higher the detection range and temperature detection accuracy of the first and second plug connectors A and B.

Figure 3:
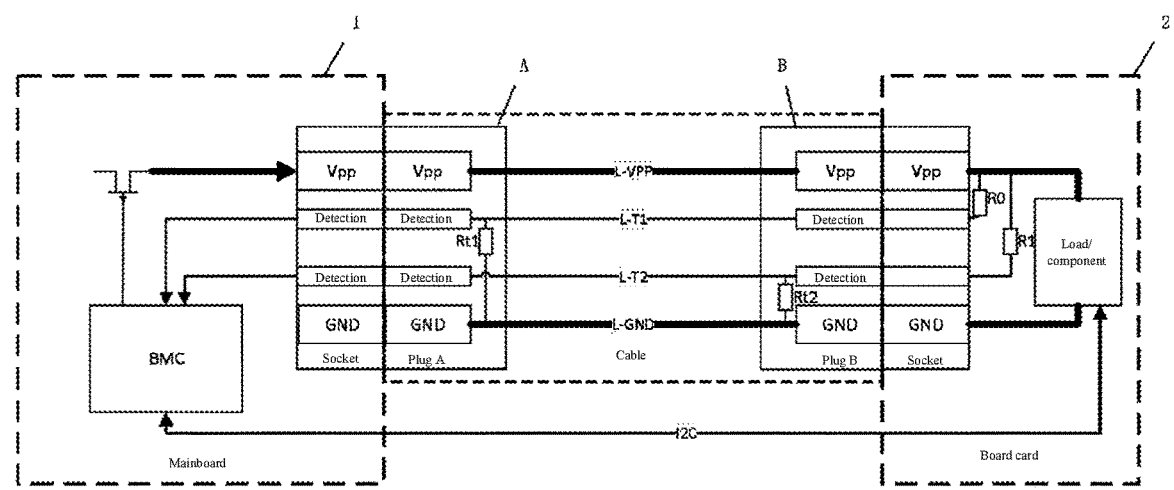
FIG. 3 is a structural distribution diagram showing a third server card apparatus according to an embodiment of the present application.

In the connection scheme of FIG. 3, the card 2 includes two voltage dividing resistors R0 and R1, the cable includes two thermistors Rt1 and Rt2, and two detection lines L-T1 and L-T2, wherein: each detection line L-T is connected to a voltage dividing resistor R and a thermistor Rt; the two thermistors Rt are provided in the first plug connector A and the second plug connector B, respectively. It can be understood that in this connection scheme, the detection paths of the two thermistors Rt1 and Rt2 are independent and have no mutual influence, and not only can it be determined that an abnormality exists in the two connectors, but also can it be accurately distinguished whether the abnormality occurs in the first plug connector A or the second plug connector B.

Figure 4:
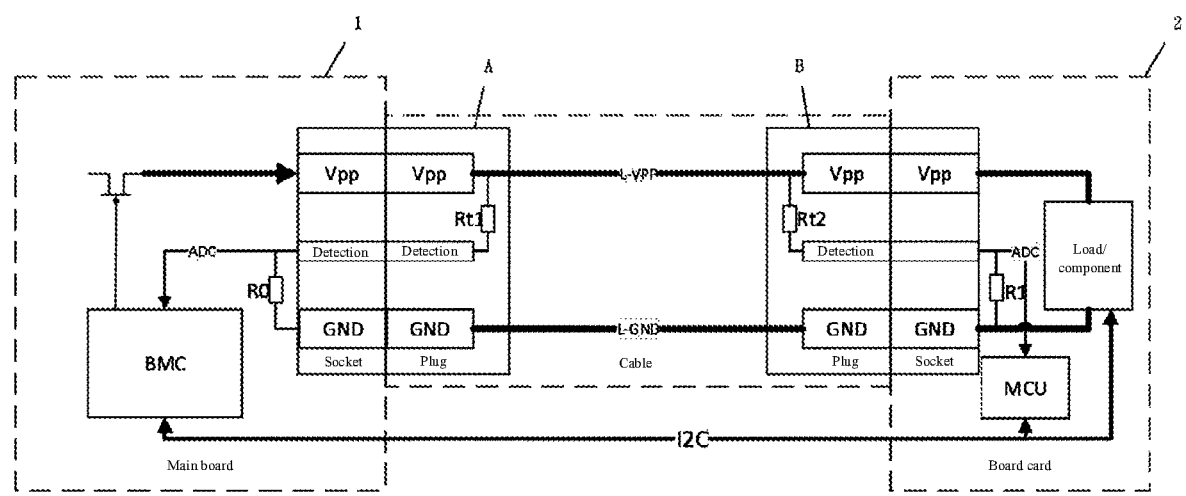
FIG. 4 is a structural distribution diagram showing a fourth server card apparatus according to an embodiment of the present application.

Alternatively, as already mentioned above, the position of the voltage dividing resistor R does not affect the accuracy of the detection, so if the two voltage dividing resistors R0 and R1 are located in the main board 1 and the card 2, respectively, in FIG. 3, the part of the detection line L-T in the middle of the cable can also be eliminated, leaving only the connection part in the plug, as shown in FIG. 4, not only accurately distinguishing the states of the two plugs A and B, but also reducing the design cost of the cable. However, it should be noted that the signal in the second plug connector B cannot be sent to the BMC to the BMC via the detection line L-T, and therefore it is necessary to sample the electrical signal in the second plug connector B inside the card 2 and then transmit same to the main board via the communication line I2C with the main board 1.

It can be understood that, regardless of how the thermistor Rt and the voltage dividing resistor R are connected, the purpose thereof is always to determine whether the first plug connector A and the second plug connector B are connected normally and whether the temperature is abnormal, that is to say, it is necessary to accurately determine the temperature condition connection, thereby accurately preventing the occurrence of ablation.

Alternatively, the BMC controls the power switch of the main board 1 to power the card 2 and periodically reads the electrical parameters. After reading the electrical parameters, the BMC is used for determining the temperature of the plug connector according to the electrical parameter, and determining whether the temperature of the first plug connector A and the second plug connector B is abnormal, and if yes, executing a temperature abnormality regulation strategy on the card 2;

the temperature abnormality regulation strategy includes limiting power consumption, and/or reducing frequency, and/or partially powering down, and/or powering down the card 2.

According to some embodiments, the BMC is also used for acquiring configuration information about the card 2 to determine a temperature abnormality regulation strategy corresponding to the card 2. The configuration information the card 2 is usually stored in a Micro Control Unit (MCUMCU), a Field Replace Unit (FRU) or an Electrically Erasable Programmable Read Only Memory (EEPROM), and the BMC of the main board 1 can read component information and configuration information via an Inter-Integrated Circuit (I2C) to learn whether the BMC can limit power consumption of the card 2, and/or reduce frequency, and/or partially power-off, and/or power-off of the card 2. If the card 2 allows limiting the power or reducing the frequency, the power consumption is limited or the frequency of the components on the card 2 is reduced according to the loadable current or power consumption of the cable, so that the current on the cable and the two connectors is not overloaded, thereby preventing the occurrence of a burn-out accident, and a log alarm is recorded; if the card 2 does not allow limiting the power and reducing the frequency, an emergency alarm is immediately reported; if the overcurrent/temperature abnormality cannot be relieved at all times within a plurality of detection cycles, if the card 2 allows partial power-off, the gradual power-off operation is performed on some components on the card 2 which can directly power-off; if not, it is determined whether the card 2 can be directly powered-off; if yes, the card 2 is directly powered-off; and if not, a power-off operation is performed. BMC can implement different temperature abnormality control strategies according to different cards and card components actually connected, to achieve maximum non-impact on business under no load, and if necessary, the operation of disconnecting the power supply of card 2 or directly shutting down according to different cards is performed to prevent the situation of overcurrent wire or connector burnout. The status of the cable can be recorded and alerted at the same time.

Alternatively, BMC is also used for: acquiring a card temperature of the card 2, comparing the plug connector temperature with the card temperature, and when a difference value between the plug connector temperature and the card temperature exceeds a preset range, determining that the temperature of the first plug connector A or the second plug connector B is abnormal.

It can be understood that if the plug-in temperature and the temperature change trend of the overall server card apparatus are consistent, the plug-in temperature can be considered to be a normal change, excluding an abnormal temperature rise; therefore, the plug-in temperature and the card temperature or the main board temperature can be compared, and only if the difference between the plug-in temperature and the card temperature or the main board temperature is out of a preset range, the plug-in temperature is determined to be abnormal.

Alternatively, BMC is also used for: determining whether the connection state of the first plug connector A and the second plug connector B is abnormal according to the electrical parameter, and if yes, sending out alarm information.

According to some embodiments, the electrical parameter read by the BMC includes the resistance of the thermistor Rt and the voltage of the detection line, wherein the resistance of the thermistor Rt corresponds to the specific temperature at the position thereof, and the voltage of the detection line can infer the connection state of the first plug connector A and the second plug connector B and the passing of the current, and the determined abnormal conditions include a high-temperature abnormal, an over-current abnormal and a connection abnormal, etc. According to some embodiments, the connection state includes the connection state of either the mating male and female heads of any of the connectors, or any of the line pins on the receptacle and plug. Take FIG. 3 as an example, there are at least a plurality of cases in the following table 1 in the connection state:

TABLE 1

Corresponding relationship between voltage and connection state

| Detection voltage of detection line L-T1 | Detection voltage of detection line L-T2 | Connection state |
| --- | --- | --- |
| Vpp | Any voltage is possible | Connection of L-GND is abnormal |
| GND | Any voltage is possible | L-VPP Connection is abnormal |
| Vpp | Vpp | Connection of the first plug connector A is abnormal |
| Normal (rational voltage) | GND | Connection of L-T2 is abnormal |

The present application discloses a server card apparatus including: a main board, a card including a voltage dividing resistor, and a cable connected to the main board by means of a first plug connector and connected to the card by means of a second plug connector; wherein the cable includes a power line, a grounding line, a detection line, and a plurality of thermistors; wherein either end of the power line, the grounding line and the detection line are respectively connected into the first plug connector and the second plug connector;

the plurality of the thermistors are respectively arranged in the first plug connector and the second plug connector, a first end of the voltage dividing resistor and the plurality of the thermistors are both connected to the detection line, a second end of the voltage dividing resistor is connected to the power line or the grounding line, and a second end of each of the thermistors is connected to the grounding line or to the power line; and a BMC in the main board acquires electrical parameters of the plurality of thermistors by means of the detection line, and determines, according to the electrical parameters, whether the first plug connector and the second plug connector are abnormal or not. According to an embodiment of the present application, the detection line for state detection and the thermistors are provided in the cable, the voltage dividing resistor is provided in the card, the BMC of the main board can rapidly know the state of the first plug connector and the state of the second plug connector by means of the thermistors, the efficiency and the accuracy of the thermistors are far higher than those of the prior art, and the electrical parameters of the thermistors have higher reference value.

Accordingly, an embodiment of the present application further discloses a method for detecting a server card apparatus, applied to the above-mentioned server card apparatus, the method including:

acquiring, by a BMC in the main board, electrical parameters of the plurality of thermistors by means of the detection line, and determining, according to the electrical parameters, whether the first plug connector and the second plug connector are abnormal or not.

In some embodiments, the process of determining whether the first plug connector and the second plug connector are abnormal according to the electrical parameter includes:

determining the temperature of the plug connector according to the electrical parameter, and determining whether the temperature of the first plug connector and the second plug connector is abnormal, and if yes, executing a temperature abnormality regulation strategy on the card;

the temperature abnormality regulation strategy includes limiting power consumption, and/or reducing frequency, and/or partially powering down, and/or powering down the card.

In some embodiments, prior to executing the temperature abnormality regulation strategy on the card, further including:

acquiring configuration information about the card to determine a temperature abnormality regulation strategy corresponding to the card.

It will be appreciated that for the server card apparatuses in the above embodiments, the BMC controls the power switch of the motherboard to power the card and periodically read the electrical parameters. After reading the electrical parameters, the BMC determines the temperature of the plug connectors according to the electrical parameters, and determines whether the temperatures of the first plug connector and the second plug connector are abnormal, and if yes, a temperature abnormality regulation strategy is executed on the card; temperature anomaly regulation strategies include limiting power consumption, and/or decreasing frequency, and/or partial power down, and/or card power down.

According to some embodiments, the BMC acquires configuration information about the card to determine a temperature abnormality regulation strategy corresponding to the card. The configuration information about the card is usually stored in the MCU, FRU or EEPROM, and the BMC of the main board can read the component information and the configuration information via the I2C to learn whether the BMC can limit the power consumption of the card, and/or reduce the frequency, and/or partially power-off, and/or power-off of the card. If the card allows limiting the power or reducing the frequency, the power consumption is limited or the frequency of the components on the card is reduced according to the loadable current or power consumption of the cable, so that the current on the cable and the two connectors is not overloaded, thereby preventing the occurrence of a burn-out accident, and a log alarm is recorded; if the card does not allow limiting the power and reducing the frequency, an emergency alarm is immediately reported; if the overcurrent/temperature abnormality cannot be relieved at all times within a plurality of detection cycles, if the card allows partial power-off, the gradual power-off operation is performed on some components on the card which can directly power-off; if not, it is determined whether the card can be directly powered-off; if yes, the card is directly powered-off; and if not, a power-off operation is performed. BMC can implement different temperature abnormality control strategies according to different cards and card components actually connected, to achieve maximum non-impact on business under no load, and if necessary, the operation of disconnecting the power supply of card or directly shutting down according to different cards is performed to prevent the situation of overcurrent wire or connector burnout. The status of the cable can be recorded and alerted at the same time.

In some embodiments, the detection method further includes: acquiring a card temperature of the card, comparing the plug connector temperature with the card temperature, and when a difference value between the plug connector temperature and the card temperature exceeds a preset range, determining that the temperature of the first plug connector or the second plug connector is abnormal.

It can be understood that if the plug-in temperature and the temperature change trend of the overall server card apparatus are consistent, the plug-in temperature can be considered to be a normal change, excluding an abnormal temperature rise; therefore, the plug-in temperature and the card temperature or the main board temperature can be compared, and only if the difference between the plug-in temperature and the card temperature or the main board temperature is out of a preset range, the plug-in temperature is determined to be abnormal.

In some embodiments, the detection method further includes: determining, by the BMC, whether the connection state of the first plug connector and the second plug connector is abnormal according to the electrical parameter, and if yes, sending out alarm information.

According to some embodiments, the electrical parameter read by the BMC includes the resistance of the thermistor Rt and the voltage of the detection line, wherein the resistance of the thermistor Rt corresponds to the specific temperature at the position thereof, and the voltage of the detection line can infer the connection state of the first plug connector and the second plug connector and the passing of the current, and the determined abnormal conditions include a high-temperature abnormal, an over-current abnormal and a connection abnormal, etc. According to some embodiments, the connection state includes the connection state of either the mating male and female heads of any of the connectors, or any of the line pins on the receptacle and plug.

According to the present application, the detection line for state detection and the thermistors are provided in the cable, the voltage dividing resistor is provided in the card, the BMC of the main board can rapidly know the state of the first plug connector and the state of the second plug connector by means of the thermistors, the efficiency and the accuracy of the thermistors are far higher than those of the prior art, and the electrical parameters of the thermistors have higher reference value.

The embodiments of the present application further disclose a method for detecting a server card apparatus, including a processor and a memory; wherein when the processor executes the computer program stored in the memory, the following steps are implemented:

acquiring, by a BMC in the main board, electrical parameters of the plurality of thermistors by means of the detection line, and determining, according to the electrical parameters, whether the first plug connector and the second plug connector are abnormal or not.

According to the present application, the detection line for state detection and the thermistors are provided in the cable, the voltage dividing resistor is provided in the card, the BMC of the main board can rapidly know the state of the first plug connector and the state of the second plug connector by means of the thermistors, the efficiency and the accuracy of the thermistors are far higher than those of the prior art, and the electrical parameters of the thermistors have higher reference value.

In some embodiments, when the processor executes a computer subroutine stored in the memory, the following steps can be implemented:

determining the temperature of the plug connector according to the electrical parameter, and determining whether the temperature of the first plug connector and the second plug connector is abnormal, and if yes, executing a temperature abnormality regulation strategy on the card;

the temperature abnormality regulation strategy includes limiting power consumption, and/or reducing frequency, and/or partially powering down, and/or powering down the card.

In some embodiments, when the processor executes a computer subroutine stored in the memory, the following steps can be implemented:

acquiring configuration information about the card to determine a temperature abnormality regulation strategy corresponding to the card.

In some embodiments, when the processor executes a computer subroutine stored in the memory, the following steps can be implemented:

acquiring a card temperature of the card, comparing the plug connector temperature with the card temperature, and when a difference value between the plug connector temperature and the card temperature exceeds a preset range, determining that the temperature of the first plug connector or the second plug connector is abnormal.

In some embodiments, when the processor executes a computer subroutine stored in the memory, the following steps can be implemented:

determining whether the connection state of the first plug connector and the second plug connector is abnormal according to the electrical parameter, and if yes, sending out alarm information.

Alternatively, embodiments of the present application further disclose a readable storage medium, where the readable storage medium includes a RAM, a memory, a read only memory (ROM), an electrically programmable ROM, an electrically erasable programmable ROM, a register, a hard disk, a removable hard disk, a CD-ROM, or any other form of storage medium known in the art. A computer program is stored in a readable storage medium, and when executed by a processor, the computer program realizes the following steps:

acquiring, by a BMC in the main board, electrical parameters of the plurality of thermistors by means of the detection line, and determining, according to the electrical parameters, whether the first plug connector and the second plug connector are abnormal or not.

According to the present application, the detection line for state detection and the thermistors are provided in the cable, the voltage dividing resistor is provided in the card, the BMC of the main board can rapidly know the state of the first plug connector and the state of the second plug connector by means of the thermistors, the efficiency and the accuracy of the thermistors are far higher than those of the prior art, and the electrical parameters of the thermistors have higher reference value.

In some embodiments, when a computer subprogram stored in the readable storage medium is executed by a processor, the following steps can be implemented:

determining the temperature of the plug connector according to the electrical parameter, and determining whether the temperature of the first plug connector and the second plug connector is abnormal, and if yes, executing a temperature abnormality regulation strategy on the card;

the temperature abnormality regulation strategy includes limiting power consumption, and/or reducing frequency, and/or partially powering down, and/or powering down the card.

In some embodiments, when a computer subprogram stored in the readable storage medium is executed by a processor, the following steps can be implemented:

acquiring configuration information about the card to determine a temperature abnormality regulation strategy corresponding to the card.

In some embodiments, when a computer subprogram stored in the readable storage medium is executed by a processor, the following steps can be implemented:

acquiring a card temperature of the card, comparing the plug connector temperature with the card temperature, and when a difference value between the plug connector temperature and the card temperature exceeds a preset range, determining that the temperature of the first plug connector or the second plug connector is abnormal.

In some embodiments, when a computer subprogram stored in the readable storage medium is executed by a processor, the following steps can be implemented:

determining whether the connection state of the first plug connector and the second plug connector is abnormal according to the electrical parameter, and if yes, sending out alarm information.

Finally, it is also noted that relational terms such as first and second, and the like, may be used herein to distinguish one entity or action from another entity or action without necessarily requiring or implying any actual such relationship or order between such entities or actions. Further, the terms "includes", "including", or any other variation thereof, are intended to cover a non-exclusive inclusion, such that a process, method, article, or apparatus that includes a list of elements does not include only those elements but may include other elements not expressly listed or inherent to such process, method, article, or apparatus. An element proceeded by the phrase "includes a . . . " does not, without more constraints, preclude the existence of additional identical elements in the process, method, article, or apparatus that includes the element.

A server card apparatus, a detection method therefore, a detection apparatus thereof, and a storage medium provided in the present application are described in detail above, and the principles and embodiments of the present application are described herein by using specific examples. The description of the above examples is only for helping to understand the method and the core idea of the present application. At the same time, for a person skilled in the art in the art, according to the idea of the present application, there would be changes in the specific embodiments and the application scope, and in summary, the contents of the present description should not be construed as limiting the present application.

The invention claimed is:

1. A server card apparatus, comprising: a main board, a card comprising a voltage dividing resistor, and a cable connected to the main board by means of a first plug connector and connected to the card by means of a second plug connector; the cable comprises a power line, a grounding line, a detection line, and a plurality of thermistors;

wherein two ends of the power line, two ends of the grounding line and two ends of the detection line are respectively connected into the first plug connector and the second plug connector;

the plurality of the thermistors are respectively arranged in the first plug connector and the second plug connector, a first end of the voltage dividing resistor and the plurality of the thermistors are both connected to the detection line, a second end of the voltage dividing resistor is connected to the power line or the grounding line, and a second end of each of the thermistors is connected to the grounding line or to the power line; and a Baseboard Management Controller (BMC) in the main board acquires electrical parameters of the plurality of thermistors by means of the detection line, and determines, according to the electrical parameters, whether the first plug connector and the second plug connector are abnormal or not.

2. The server card apparatus according to claim 1, wherein the card comprises two of the voltage dividing resistors, the cable comprises two of the thermistors and two of the detection lines, wherein:

each of the detection lines is connected to one of the voltage dividing resistors and one of the thermistors; and two thermistors are respectively provided in the first plug connector and the second plug connector.

3. The server card apparatus according to claim 1, wherein a plurality of the thermistors are divided into two groups, respectively dispersed in the first plug connector and the second plug connector.

4. The server card apparatus according to claim 1, wherein the BMC is configured for:

determining the temperature of the plug connector according to the electrical parameter, and determining whether the temperature of the first plug connector and the second plug connector is abnormal, and if yes, executing a temperature abnormality regulation strategy on the card;

the temperature abnormality regulation strategy comprises limiting power consumption, and/or reducing frequency, and/or partially powering down, and/or powering down the card.

5. The server card apparatus according to claim 4, wherein the BMC is further configured for:

acquiring a card temperature of the card, comparing the plug connector temperature with the card temperature, and when a difference value between the plug connector temperature and the card temperature exceeds a preset range, determining that the temperature of the first plug connector or the second plug connector is abnormal.

6. The server card apparatus according to claim 5, wherein the BMC is further configured for:
determining whether the connection state of the first plug connector and the second plug connector is abnormal according to the electrical parameter, and if yes, sending out alarm information.

7. The server card apparatus according to claim 4, wherein the BMC is further configured for:
acquiring configuration information about the card to determine a temperature abnormality regulation strategy corresponding to the card.

8. The server board card apparatus according to claim 1, wherein the temperature of the first plug connector and the temperature of the second plug connector is reflected on the electrical parameter of the thermistor.

9. The server card apparatus according to claim 1, wherein the voltage dividing resistor and the thermistor are connected in series between the power supply line and the connection line.

10. The server card apparatus according to claim 1, wherein there is one voltage dividing resistor and one detection line, and two thermistors, wherein one of the thermistors is located in the first plug connector, and the other one of the thermistors is located in the second plug connector, the two thermistors are connected in parallel.

11. The server card apparatus according to claim 4, wherein if the plug-in temperature and the temperature change trend of the overall server card apparatus are consistent, the plug-in temperature is considered to be a normal change, excluding an abnormal temperature rise.

12. A method for detecting a server card apparatus, wherein the method is applied to the server card apparatus, the server card apparatus comprises: a main board, a card comprising a voltage dividing resistor, and a cable connected to the main board by means of a first plug connector and connected to the card by means of a second plug connector; the cable comprises a power line, a grounding line, a detection line, and a plurality of thermistors;
wherein two ends of the power line, two ends of the grounding line and two ends of the detection line are respectively connected into the first plug connector and the second plug connector;
the plurality of the thermistors are respectively arranged in the first plug connector and the second plug connector, a first end of the voltage dividing resistor and the plurality of the thermistors are both connected to the detection line, a second end of the voltage dividing resistor is connected to the power line or the grounding line, and a second end of each of the thermistors is connected to the grounding line or to the power line; and
a Baseboard Management Controller (BMC) in the main board acquires electrical parameters of the plurality of thermistors by means of the detection line, and determines, according to the electrical parameters, whether the first plug connector and the second plug connector are abnormal or not,
the method comprising:
acquiring, by the BMC in the main board, the electrical parameters of the plurality of thermistors by means of the detection line, and determining, according to the electrical parameters, whether the first plug connector and the second plug connector are abnormal or not.

13. An apparatus for detecting a server card apparatus, wherein the server card apparatus comprises: a main board, a card comprising a voltage dividing resistor, and a cable connected to the main board by means of a first plug connector and connected to the card by means of a second plug connector; the cable comprises a power line, a grounding line, a detection line, and a plurality of thermistors;
wherein two ends of the power line, two ends of the grounding line and two ends of the detection line are respectively connected into the first plug connector and the second plug connector;
the plurality of the thermistors are respectively arranged in the first plug connector and the second plug connector, a first end of the voltage dividing resistor and the plurality of the thermistors are both connected to the detection line, a second end of the voltage dividing resistor is connected to the power line or the grounding line, and a second end of each of the thermistors is connected to the grounding line or to the power line; and
a Baseboard Management Controller (BMC) in the main board acquires electrical parameters of the plurality of thermistors by means of the detection line, and determines, according to the electrical parameters, whether the first plug connector and the second plug connector are abnormal or not,
the apparatus for detecting the server card apparatus comprises:
a memory for storing a computer program;
a processor, when executing the computer program, for implementing operation of a method for detecting the server card apparatus comprising:
acquiring, by the BMC in the main board, the electrical parameters of the plurality of thermistors by means of the detection line, and determining, according to the electrical parameters, whether the first plug connector and the second plug connector are abnormal or not.

14. The apparatus for detecting a server card apparatus according to claim 13, wherein the card comprises two of the voltage dividing resistors, the cable comprises two of the thermistors and two of the detection lines, wherein:
each of the detection lines is connected to one of the voltage dividing resistors and one of the thermistors; and
two thermistors are respectively provided in the first plug connector and the second plug connector.

15. The apparatus for detecting a server card apparatus according to claim 13, wherein a plurality of the thermistors are divided into two groups, respectively dispersed in the first plug connector and the second plug connector.

16. The apparatus for detecting a server card apparatus according to claim 13, wherein the BMC is configured for:
determining the temperature of the plug connector according to the electrical parameter, and determining whether the temperature of the first plug connector and the second plug connector is abnormal, and if yes, executing a temperature abnormality regulation strategy on the card;
the temperature abnormality regulation strategy comprises limiting power consumption, and/or reducing frequency, and/or partially powering down, and/or powering down the card.

17. The apparatus for detecting a server card apparatus according to claim 16, wherein the BMC is further configured for:
acquiring a card temperature of the card, comparing the plug connector temperature with the card temperature, and when a difference value between the plug connector temperature and the card temperature exceeds a preset range, determining that the temperature of the first plug connector or the second plug connector is abnormal.

18. The apparatus for detecting a server card apparatus according to claim 17, wherein the BMC is further configured for:

determining whether the connection state of the first plug connector and the second plug connector is abnormal according to the electrical parameter, and if yes, sending out alarm information.

19. The apparatus for detecting a server card apparatus according to claim 16, wherein the BMC is further configured for:

acquiring configuration information about the card to determine a temperature abnormality regulation strategy corresponding to the card.

20. A non-transitory computer readable storage medium having stored thereon a computer program which when executed by a processor implements the steps of the method for detecting the server card apparatus according to claim 12.

\* \* \* \* \*